(12) United States Patent
Tanaka

(10) Patent No.: US 9,979,907 B2
(45) Date of Patent: May 22, 2018

(54) MULTI-LAYERED HIGH-DYNAMIC RANGE SENSOR

(71) Applicants:Sony Corporation, Tokyo (JP); Sony Pictures Entertainment Inc., Culver City, CA (US)

(72) Inventor: Kazunori Tanaka, Irvine, CA (US)

(73) Assignees: SONY CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 0 days. days.

(21) Appl. No.: 14/859,115

(22) Filed: Sep. 18, 2015

(65) Prior Publication Data

US 2017/0085816 A1    Mar. 23, 2017

(51) Int. Cl.
| | |
|---|---|
| *H04N 3/14* | (2006.01) |
| *H04N 5/335* | (2011.01) |
| *H04N 5/355* | (2011.01) |
| *H04N 5/235* | (2006.01) |
| *H04N 5/369* | (2011.01) |

(52) U.S. Cl.
CPC ....... *H04N 5/35563* (2013.01); *H04N 5/2356* (2013.01); *H04N 5/35518* (2013.01); *H04N 5/369* (2013.01)

(58) Field of Classification Search
CPC ........... H01L 27/1464; H01L 27/14647; H01L 27/14656; H01L 31/02
USPC ......... 348/296, 297, 308–310; 257/294, 447, 257/460; 250/208.1
See application file for complete search history.

(56) References Cited

U.S. PATENT DOCUMENTS

| | | | |
|---|---|---|---|
| 5,789,737 A | 8/1998 | Street | |
| 5,965,875 A * | 10/1999 | Merrill | H01L 27/14623 |
| | | | 250/208.1 |
| 6,868,138 B2 | 3/2005 | Clinthorne et al. | |
| 7,084,905 B1 | 8/2006 | Nayer et al. | |
| 7,214,922 B2 | 5/2007 | Tabika et al. | |
| 8,440,978 B2 | 5/2013 | Morf | |
| 8,816,460 B2 * | 8/2014 | Kalevo | G01J 1/46 |
| | | | 250/208.1 |
| 9,070,611 B2 * | 6/2015 | McCarten | H01L 27/1464 |
| 9,257,478 B2 * | 2/2016 | Bloom | H01L 27/14806 |
| 2009/0073292 A1 * | 3/2009 | Castorina | H04N 5/35554 |
| | | | 348/294 |
| 2010/0002106 A1 * | 1/2010 | Granquist-Fraser | H01L 27/14647 |
| | | | 348/294 |
| 2010/0276736 A1 | 11/2010 | Bocko et al. | |
| 2011/0062341 A1 | 3/2011 | Wever et al. | |
| 2014/0198240 A1 * | 7/2014 | Rhoads | H01L 27/14625 |
| | | | 348/294 |
| 2014/0267851 A1 * | 9/2014 | Rhoads | H01L 27/14647 |
| | | | 348/294 |

* cited by examiner

*Primary Examiner* — Kelly L Jerabek
(74) *Attorney, Agent, or Firm* — Procopio, Cory, Hargreaves & Savitch LLP

(57) ABSTRACT

An image sensor including: a plurality of sensing elements, each sensing element including a plurality of layers of varying sensitivities, wherein the plurality of layers is configured to record impinging photons, and wherein each layer of each sensing element is configured to attenuate flow of the photons into the next layer. Key words include a multi-layered sensor and high-dynamic range.

14 Claims, 4 Drawing Sheets

MULTI-LAYERED HIGH-DYNAMIC RANGE SENSOR

BACKGROUND

Field of the Disclosure

The present disclosure relates to sensors, and more specifically, to a multi-layered high-dynamic range sensor.

Background

An imaging system depends on an image sensor to generate an electronic representation of a visual image. Examples of image sensors include charge coupled device (CCD) image sensors and active pixel sensor (APS) devices. Typically, these images sensors include a plurality of light sensitive pixels (or sensing elements) arranged in a regular pattern of rows and columns.

The quality of an image captured on an imaging sensor partly depends on the dynamic range of the image sensor. Thus, an image sensor that can provide a wider dynamic range than the dynamic range provided by the conventional image sensor is desirable. For example, when capturing scenes that include drastic lighting changes with brightness from direct sunlight to deep shadow, the stronger light saturates the sensing elements and the actual light radiance, corresponding to those saturated elements, cannot be obtained. Accordingly, high dynamic range sensors are needed for capturing scenes that include such drastic lighting changes.

SUMMARY

The present disclosure provides for an image sensor having multiple layers, wherein each layer is configured to record photons at different sensitivities.

In one implementation, an image sensor is disclosed. The image sensor includes: a plurality of sensing elements, each sensing element including a plurality of layers of varying sensitivities, wherein the plurality of layers is configured to record impinging photons, and wherein each layer of each sensing element is configured to attenuate flow of the photons into the next layer.

In another implementation, a method is disclosed. The method includes: recording photons incident on an image sensor with a plurality of sensing elements, each sensing element including a plurality of layers; configuring each layer of the plurality of layers with a different sensitivity; and storing the recorded photons for each layer of the plurality of layers.

In another implementation, an apparatus is disclosed. The apparatus includes: means for recording incident photons configured with multiple layers of varying sensitivities; and means for storing the recorded photons for each layer of the multiple layers.

Other features and advantages of the present disclosure should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended further drawings, in which like reference numerals refer to like parts, and in which.

DETAILED DESCRIPTION

To obtain wider dynamic range from an image sensor, a conventional solution has used a combination of light sensitive pixels or sensing elements (i.e., sensels), wherein some sensels are covered by a neutral density filter or use other methods to reduce the sensitivity. By recreating an image using sensels that had different exposure settings, a higher dynamic range image can be generated. A drawback for this method is that the number of sensels per unit area is reduced by a factor equal to the number of filters used, which reduces the resolution of the image sensor. Another conventional solution uses the image sensor to take multiple images with different exposures, so that the images can be composited later into a single high-dynamic range image. The drawback for this solution is that the final image may suffer from ghosting when there are movements between the exposures.

To address the shortcomings of the conventional solutions to the dynamic range problems with image sensors, several implementations as disclosed herein provide for having multiple layers for each sensel, wherein each layer is configured to record photons at different sensitivities. For example, in one implementation, each sensel in an image sensor is configured with three layers. The top layer may be configured as the most sensitive layer. The second layer may be configured as 8 times less sensitive than the top layer. The third layer, positioned below the second layer, may be configured as 64 times less sensitive than the top layer.

After reading this description it will become apparent how to implement the disclosure in various implementations and applications. However, although various implementations of the present disclosure will be described herein, it is understood that these implementations are presented by way of example only, and not limitation. As such, this detailed description of various implementations should not be construed to limit the scope or breadth of the present disclosure.

Figure 1:
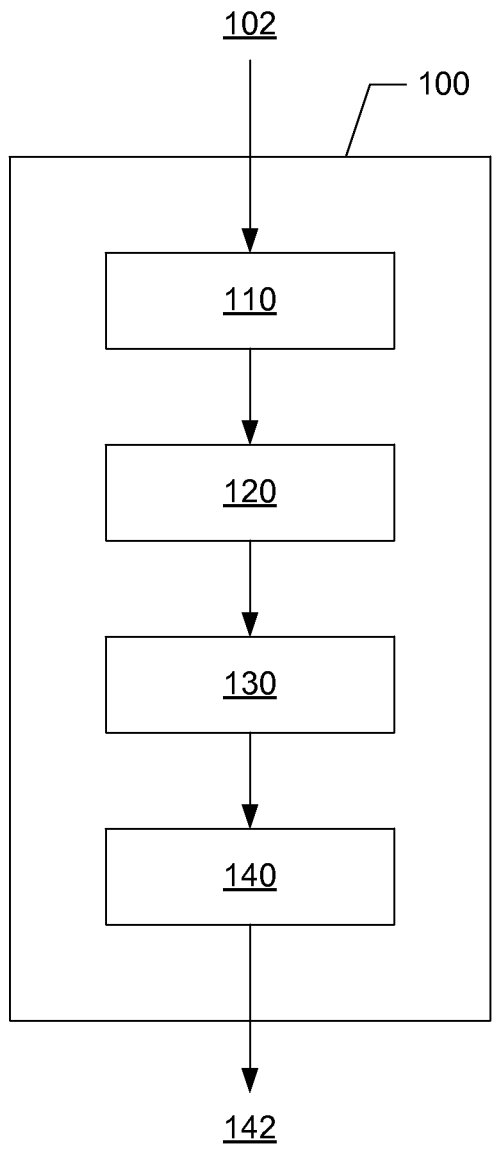
FIG. 1 is a functional block diagram illustrating an image capturing device in accordance with one implement of the present disclosure.

FIG. 1 is a functional block diagram illustrating an image capturing device 100 in accordance with one implement of the present disclosure. In one implementation, the image capturing device 100 is configured as a digital camera. In other implementations, the image capturing device 100 is configured as other types of image capturing devices. In the illustrated implementation of FIG. 1, the image capturing device 100 includes a lens 110, an imaging stage 120, an image sensor 130, and a processor 140.

The lens 110 receives and focuses the light 102 from a subject scene to form an image on the image sensor 130. The image sensor 130 converts the incident light to an electrical signal for each pixel. In one implementation, the image sensor 130 is a charge-coupled device (CCD) type. In another implementation, the image sensor 130 is an active pixel sensor (APS) type, which is often referred to as a complementary metal oxide semiconductor (CMOS) sensor because of the ability to fabricate them using a CMOS fabrication process.

In one example, the operation of an image sensor (e.g., an APS) is performed in three steps: a reset step, where the sensor is reset from the previous integration cycle; an image integration step, where the light energy is collected and converted into an electrical signal; and a signal readout step, where the signal is read out. During the image integration step, light energy, in the form of photons, strikes a photodiode in a sensel, thereby creating a number of electron-hole pairs. The photodiode is designed to limit recombination between the newly-formed electron-hole pairs. Thus, the holes are attracted to the ground terminal of the photodiode, while the electrons are attracted to the positive terminal of the photodiode where each additional electron reduces the voltage on the photodiode. At the end of the integration period, the number of photons which were absorbed by the photodiode during the image integration period can be determined by subtracting the voltage at the end of the integration period from the voltage at the beginning of the integration period.

The imaging stage 120 may include elements such as a neutral density (ND) filter, an iris, a shutter, exposure controller, brightness sensor, and/or other units configured to regulate the amount of light reaching the image sensor 130. For example, the ND filter can be used to reduce or modify the intensity of all wavelengths or colors of light equally, which reduces the amount of light entering the lens. Thus, the presence of the ND filter allows a photographer to select combinations of aperture, exposure time, and sensor sensitivity to produce pictures with less overexposure. The iris and the shutter may be configured to regulate the amount of light reaching the image sensor 130 by controlling the aperture and the duration of the shutter opening. The exposure controller may respond to the amount of light available in the scene as metered by the brightness sensor and control other elements including the neutral density (ND) filter, the iris, and/or the shutter.

The dynamic range is determined by the maximum number of photons that a sensor can collect during an integration period without saturating (i.e., exceeding the capacity of) the sensor, and the minimum number of photons that a sensor can collect during the integration period that can be detected over the noise floor. As stated above, processing images with drastic lighting changes is a challenge for an image capturing device with a limited dynamic range. Thus, if the integration period of the sensor is shortened to the point where none of the bright-light information is lost, i.e., where the number of collected photons will not exceed the capacity of the sensor during the integration period, then most, if not all, of the low-light information will be lost (resulting in areas of the image that get crushed to black) because the collected photons will not be distinguishable over the noise level. In contrast, if the integration period of the sensor is increased to capture the low-light information, i.e., where the number of collected photons is detectable over the noise floor, then a significant portion of the bright-light information is lost (resulting in areas of the image that get blown out to white) because the number of collected photons will exceed the capacity of the sensor.

In one implementation, the image sensor 130 is configured with a plurality of sensing elements with each sensing element having a plurality of layers of varying sensitivities. Each layer of each sensing element is configured to attenuate the flow of photons into the next layer. Further, the data captured from each layer is combined by the processor 140 to form an output image 142 with a higher dynamic range than a typical one-layered sensor.

Figure 2:
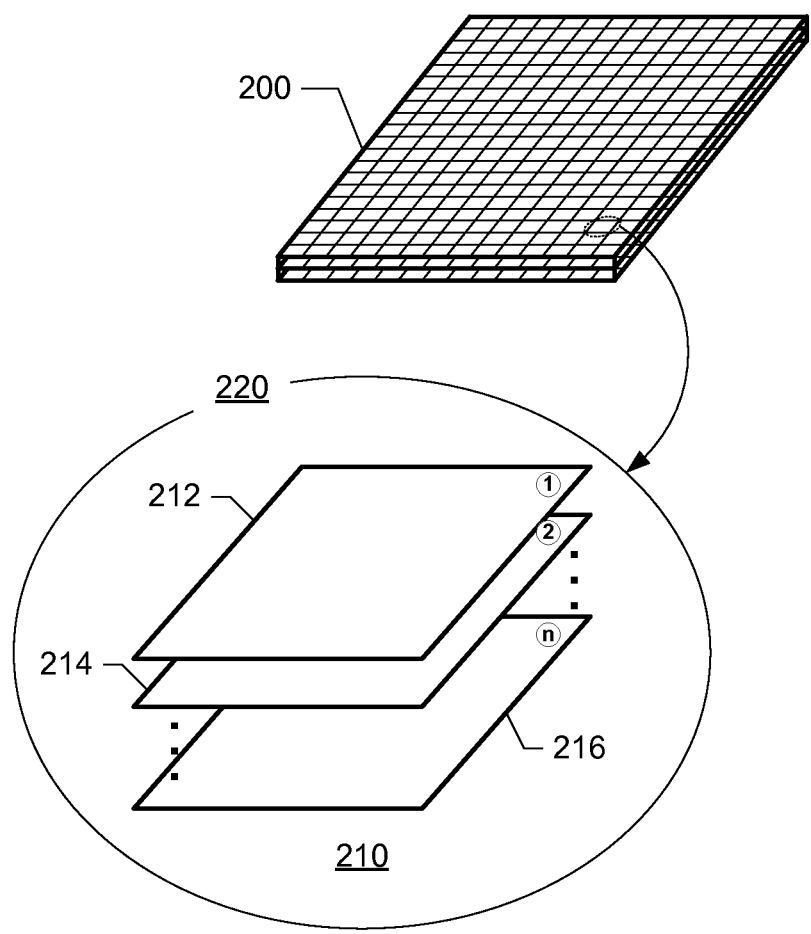
FIG. 2 is a functional diagram of an image sensor that is one implementation of the image sensor shown in FIG. 1.

FIG. 2 is a functional diagram of an image sensor 200 that is one implementation of the image sensor 130 shown in FIG. 1. The image sensor 200 includes each sensel having multiple layers of varying sensitivities. In FIG. 2, a sensel 210 of the image sensor 200 is illustrated in detail in oval 220. The sensel 210 includes multiple layers (i.e., n layers) of varying sensitivities with each layer configured to record photons at different sensitivities.

In one implementation, the sensel 210 includes n layers with the top layer (or first layer) 212 configured as being most sensitive, the second layer 214 being less sensitive than the first layer 212, and the bottom layer (or third layer) 216 being the least sensitive. For example, the first layer 212 may be designed to be the most sensitive layer, the second layer 214 may be designed to be 8 times less sensitive, and the $n^{th}$ layer 216 may be designed to be $8^{(n-1)}$ (or $8^{(3-1)}=64$ for a third layer) times less sensitive. Thus, if the brightness of the scene exceeds the designed sensitivity of the top layer, the true brightness should be recorded by the layers 212 and below. Each layer will record a value, but the layer closest to the top that has not saturated will provide the data with the best signal to noise ratio.

In one implementation, in designing the multiple layers of the image sensor 200, configuring the upper layers to be more sensitive, while configuring the lower layers to be less sensitive, is desirable because there are fewer photons reaching the lower layers. This is because when trying to image low intensity light, it is desirable to have all the available light. However, additional circuitry and/or layers of differing materials that further attenuate the flow of photons into the lower layers may be needed to most effectively use the incoming light to generate a good image. Once the photons are captured by the image sensor 200 with multiple layers, the data from the multiple layers 212, 214, 216 are combined. Therefore, the combined data from the multiple layers 212, 214, 216 forms an image with a wider dynamic range than a conventional single layer image sensor.

In another implementation, the configuration of the layers of an image sensor does not necessarily have to be done in a top-to-bottom or bottom-to-top design. The image sensor can be configured with a first layer (i.e., a most sensitive layer) on the left or right side with light entering from the left or right side. In a further variation, the layers can be configured in concentric spheres with the outer-most layer being the most sensitive layer and the inner-most layer being the least sensitive layer.

In one implementation, the output of the image sensor is piece-wise linear because the sensels are configured with linear sensitivity. Thus, the sensitivity of each layer of the image sensor is configured to be linear. In another implementation, the output of the image sensor is piece-wise non-linear because the sensels are configured with non-linear sensitivity. For example, an image sensor described in a previously-filed application by the same assignee (U.S. patent application Ser. No. 14/817,075, which is incorporated herein by reference) includes a sensor with variable sensitivity. In one particular implementation, the image sensor of the previously-filed application describes a sensor that is configured with logarithmic sensitivity to maximize the data use. Therefore, in this implementation, the sensitivity of each layer of the image sensor may be configured to be non-linear, and in particular, logarithmic, so that when pieced together, the curve is not only continuous but continuous in its curvature.

Figure 3:
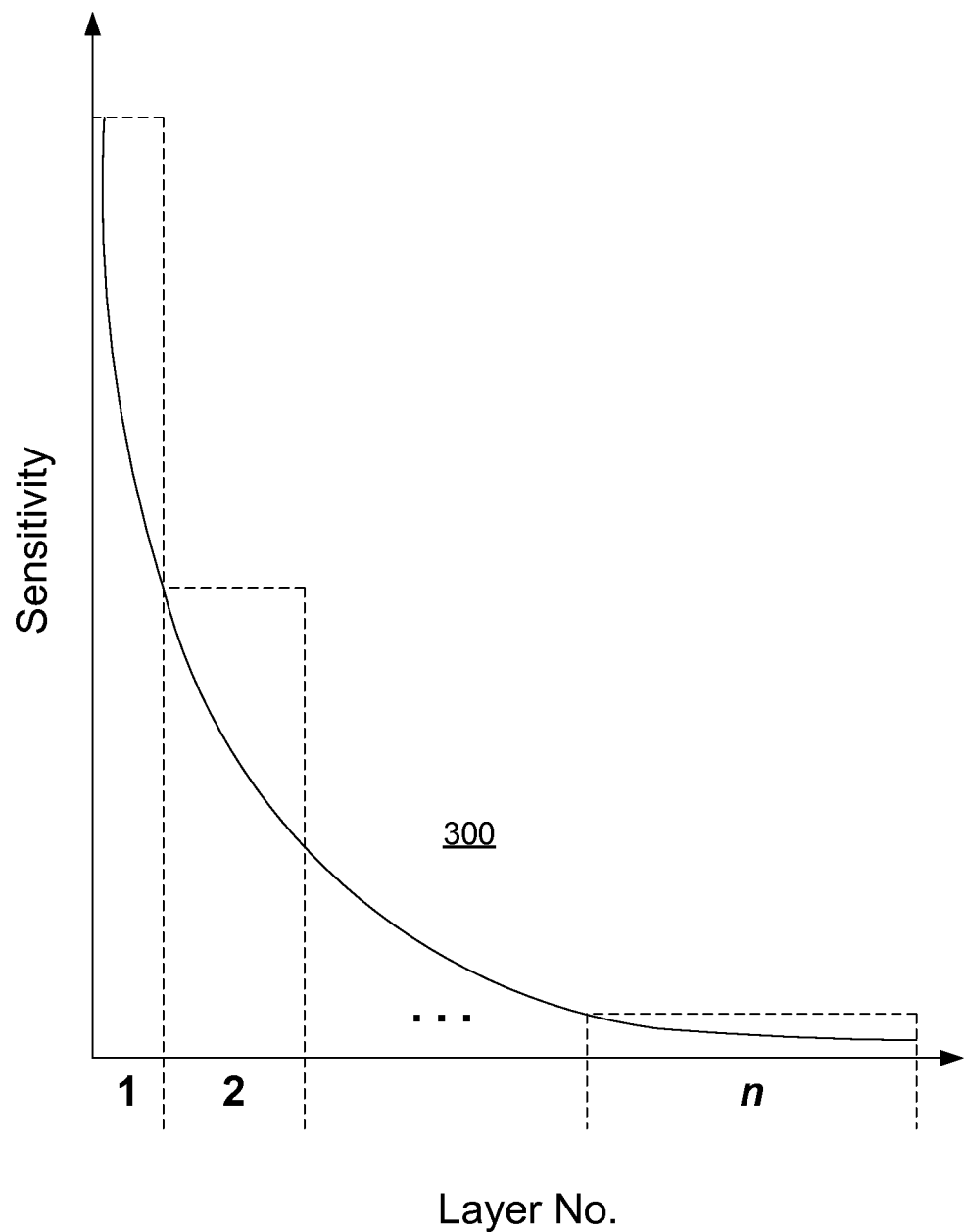
FIG. 3 is a graph showing the configuration of layers of an image sensor with non-linear sensitivity in accordance with one implementation of the present disclosure.

FIG. 3 is a graph 300 showing the configuration of layers of an image sensor with non-linear sensitivity in accordance with one implementation of the present disclosure. In the illustrated implementation of FIG. 3, the top layer (i.e., Layer 1) is designed to be most sensitive, while the bottom layer (i.e., Layer n) is designed to be least sensitive. Thus, the configuration of the layers with non-linear sensitivity enables a smoother transition from one sensitivity layer to another than the configuration of the layers with linear sensitivity. Adjustments to sensitivity are made to account for the fact that fewer photons reach lower layers.

Figure 4:
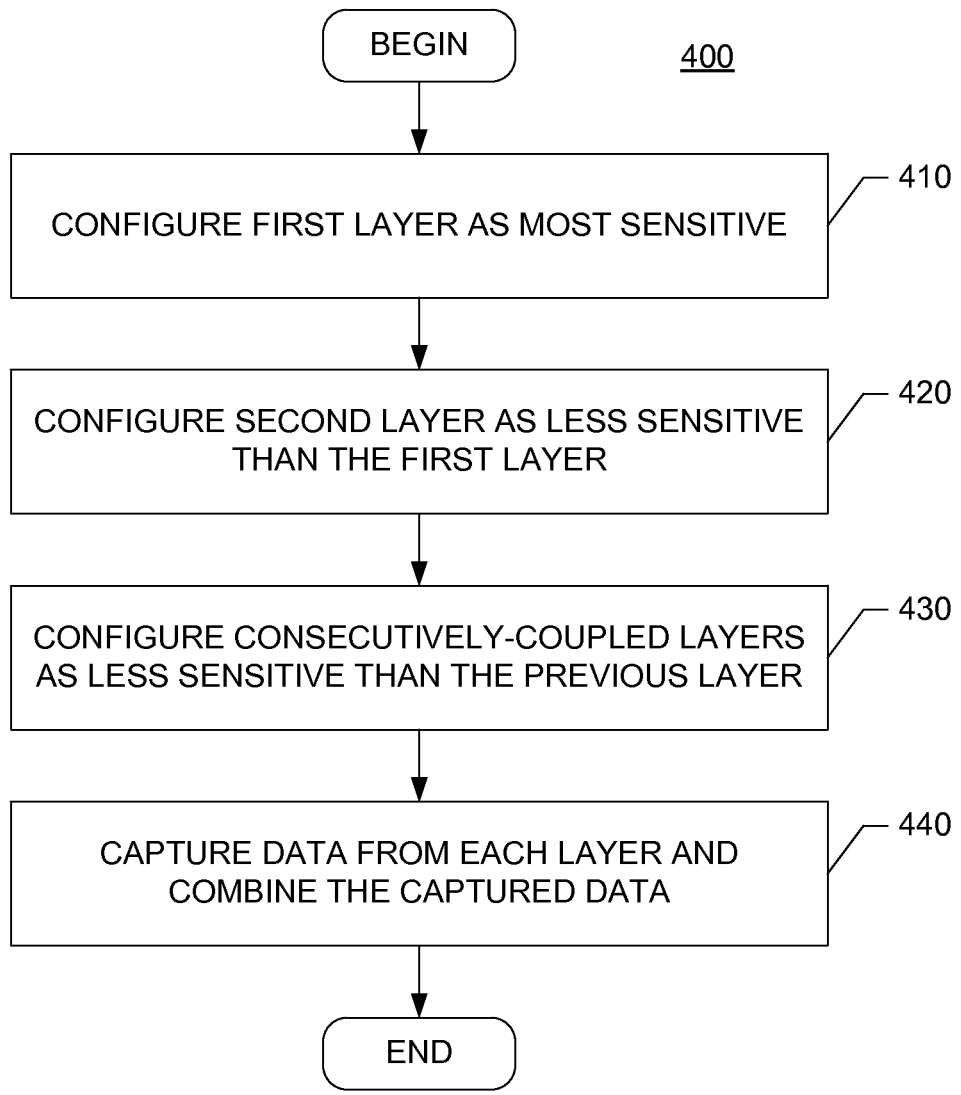
FIG. 4 is a flow diagram illustrating a method for configuring a multi-layered high-dynamic range image sensor in accordance with one implementation of the present disclosure.

FIG. 4 is a flow diagram illustrating a method 400 for configuring a multi-layered high-dynamic range image sensor in accordance with one implementation of the present disclosure. In the illustrated implementation of FIG. 4, a first layer is configured, at block 410, as being most sensitive. In one implementation, the first layer is the top layer. In another implementation, the first layer is the left or right-most layer. A second layer coupled to the first layer is configured, at block 420, as being less sensitive than the first layer. Other consecutively-coupled layers are configured, at block 430, as being less sensitive than the previous layer. The data is captured from each layer and combined to recreate the original intensities, at block 440, to form an image captured by the image sensor.

The foregoing methods and apparatus are susceptible to many variations. Additionally, for clear and brief description, many descriptions of the methods and apparatus have been simplified. Many descriptions use terminology and structures of specific standards. However, the disclosed methods and apparatus are more broadly applicable.

Those of skill in the art will appreciate that the various illustrative logical blocks, modules, units, and algorithm steps described in connection with the implementations disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the disclosure. In addition, the grouping of functions within a unit, module, block, or step is for ease of description. Specific functions or steps can be moved from one unit, module, or block without departing from the disclosure.

The above description of the disclosed implementations is provided to enable any person skilled in the art to make or use the disclosure. Various modifications to these implementations will be readily apparent to those skilled in the art, and the generic principles described herein can be applied to other implementations without departing from the spirit or scope of the disclosure. Accordingly, the techniques are not limited to the specific examples described above. Thus, it is to be understood that the description and drawings presented herein represent a presently preferred implementation of the disclosure and are therefore representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. An image capturing device, comprising:
   a plurality of sensing elements, each sensing element including a plurality of layers of varying sensitivities, wherein the plurality of layers is configured to measure impinging photons,
   wherein each layer of each sensing element is configured to attenuate flow of the photons into the next layer, and
   wherein each layer measures the photons at different sensitivity; and
   a processor configured to determine, for each sensing element, a first layer with the measurements that do not show saturation from the measurements of the plurality of layers, the processor configured to record the measurements from the first layer as a measurement for each sensing element such that the first layer for each sensing element may be a different layer of the plurality of layers depending on which layer the measurements do not show saturation, the processor further configured to combine the measurements of the plurality of sensing elements.

2. The image capturing device of claim 1, wherein a top layer of the plurality of layers is configured to be most sensitive.

3. The image capturing device of claim 2, wherein a second layer coupled to and below the top layer is configured to be less sensitive than the first layer.

4. The image capturing device of claim 2, wherein each successive layer below the top layer is configured to be successively less sensitive than the layer above.

5. The images capturing device of claim 1, wherein each layer includes additional circuitry to calibrate each sensing element.

6. The image capturing device of claim 1, wherein sensitivity of each layer of each sensing element is configured to be linear so that an output image of the image sensor is piece-wise linear.

7. The image capturing device of claim 1, wherein sensitivity of each layer of each sensing element is configured to be non-linear so that an output image of the image sensor is piece-wise non-linear.

8. The image capturing device of claim 1, wherein sensitivity of each layer of each sensing element is configured to be logarithmic so that an output image of the image sensor is piece-wise logarithmic.

9. A method, comprising:
   measuring photons incident on a plurality of layers of each sensing element of a plurality of image sensing elements in an image sensor;
   configuring each layer of the plurality of layers to measure the photons at different sensitivity;
   determining, for each sensing element, a first layer with the measurements that do not show saturation from the measurements of the plurality of layers;
   recording the measurements from the first layer as a measurement for each sensing element such that the first layer for each sensing element may be at a different layer of the plurality of layers depending on which layer the measurements do not show saturation; and
   combining the measurements of the plurality of sensing elements.

10. The method of claim 9, wherein configuring each layer comprises
   configuring a top layer of the plurality of layers to be most sensitive.

11. The method of claim 10, wherein configuring each layer comprises
   configuring each successive layer below the top layer to be successively less sensitive than the layer above.

12. The method of claim 9, wherein configuring each layer comprises
   configuring sensitivity of each layer of each sensing element to be non-linear so that an output image of the image sensor is piece-wise non-linear.

13. An apparatus, comprising:
   multiple means for measuring incident photons, each means for measuring configured with multiple layers of varying sensitivities;
   means for determining, for each means for measuring, a first layer with the measurements that do not show saturation from the measurements of the multiple layers;
   means for recording the measurements from the first layer as a measurement for each means for measuring such that the first layer for each means for measuring may be at a different layer of the plurality of layers depending on which layer the measurements do not show saturation; and
   means for combining the measurements of the plurality of means for measuring.

14. The apparatus of claim 13, wherein a top layer of the multiple layers is configured with most sensitivity.

* * * * *